United States Patent [19]

Chang et al.

[11] Patent Number: 5,043,100
[45] Date of Patent: Aug. 27, 1991

[54] PROCESS FOR MANUFACTURE OF NATURAL ANTIOXIDANT PRODUCTS FROM TEA AND SPENT TEA

[75] Inventors: Stephen S. Chang, E. Brunswick; Yongde Bao, New Brunswick, both of N.J.

[73] Assignee: Rutgers, The State University of New Jersey, New Brunswick, N.J.

[21] Appl. No.: 481,346

[22] Filed: Feb. 16, 1990

Related U.S. Application Data

[63] Continuation of Ser. No. 76,866, Jul. 23, 1987, abandoned.

[51] Int. Cl.[5] .......................... C11B 5/00; C09K 15/00
[52] U.S. Cl. .................................... 252/398; 426/546; 426/429
[58] Field of Search ..................... 426/542, 429; 252/398 APS

[56] References Cited

U.S. PATENT DOCUMENTS

| | | | |
|---|---|---|---|
| 3,950,266 | 4/1976 | Chang et al. | 426/542 |
| 4,380,506 | 4/1983 | Kimura et al. | 252/398 |
| 4,613,672 | 9/1986 | Nara | 252/398 |
| 4,673,530 | 6/1987 | Hara | 252/398 |
| 4,708,820 | 11/1987 | Mamiki et al. | 252/398 |
| 4,877,635 | 10/1989 | Todd, Jr. | 252/398 |

Primary Examiner—Deborah L. Kyle
Assistant Examiner—Valerie Fee
Attorney, Agent, or Firm—Cook, Egan, McFarron & Manzo

[57] ABSTRACT

Superior oil-soluble antioxidants are produced by the vacuum steam distillation of alcohol extracts of spent black tea or spent green tea or even the tea itself.

18 Claims, 1 Drawing Sheet

PROCESS FOR MANUFACTURE OF NATURAL ANTIOXIDANT PRODUCTS FROM TEA AND SPENT TEA

This is a continuation of copending application Ser. No. 07/076,866 filed on 07-23-87, now abandoned.

The present invention relates to antioxidants derived from tea and to a process for recovering such antioxidants.

Methanol or ethanol extract of spent tea, that is tea used in the manufacture of instant tea (both green and black), shows little, if any, antioxidant property. The present invention provides a process of vacuum steam distillation of a suspension of the alcohol extract or even of the spent tea itself (either green or black) which unexpectedly produces an oil soluble antioxidant having superior antioxidant properties, more potent than tocopherols, and BHA, equal or better than BHT.

The alcohol extract of green tea is not soluble in oil and has weak antioxidant property. The alcohol extract of black tea is oil-insoluble and has little, if any, antioxidant property. The present invention provides a vacuum steam distillation of a suspension of the alcohol extract or even the tea itself (both green and black) which yields a superior oil soluble antioxidant.

The antioxidants produced by the process of the present invention are free from synthetic components.

BACKGROUND

The discovery of the use of antioxidants to increase the storage life of foods has made possible the marketing of many new products and is a direct economic benefit to consumers. Today, antioxidants are widely used in processed foods. Their sales reached $45 million in 1975 and are projected to reach $72 million within a decade (*Food Technology*, 1976). In addition, antioxidants are widely used in pharmaceuticals, cosmetics, essential oils and plastics for food packaging.

The commonly used antioxidants today are BHT, BHA and TBHQ. They are all synthetic chemicals. There is a tendancy for the consumers to reject them. In addition, it is of great marketing advantage to claim a food product as "all natural". Use of the synthetic antioxidant will preclude such labelling.

The possible toxicity of the synthetic chemicals used as antioxidants has been a subject of study for many years (Johnson and Hewgill, 1961; Branen, 1975). The concern of the FDA on the use of BHT has been reported (*Food Chemical News* (1976). The concern stems from scientific literature reviews conducted for the FDA which focused on the enzyme-inducing effects of BHT on liver and on extraheptic organs, such as the lungs and gastrointestinal tract mucosa. The article also reported that the FDA has expressed an interest in the effect of BHT on the conversion of other ingested materials into toxic substances or carcinogens by the increase of microsomal enzymes. This is certainly nothing new because restrictions have been placed upon the use of such synthetic antioxidants by many European and Asian countries.

At the present time, BHT has been removed from the GRAS List by the FDA. After Nobuyuki Ito of Nagoya City University Medical School in Japan, 1982, reported findings showing BHA to be carcinogenic in rats, BHA is in the process of being carefully scrutinized. TBHQ has never been approved in Japan, Canada and certain European countries. These countries hold that there has been insufficient information presented to make a ruling on safety. Since an antioxidant is an unavoidable additive, very soon, the food, pharmaceutical and cosmetic industries will have no practical options because the only common natural antioxidant, mixed tocopherols, has only weak antioxidant properties. Therefore, the need of effective, safe, natural antioxidants is urgent and great.

THE PRIOR ART

The prior art has reported that certain tea leaf extracts have antioxidant properties (Kajimoto, 1963; Lee, 1984), but such antioxidants are not readily soluble in oil. Extract of black tea, that is tea leaves after the fermentation process, have been reported in literature to have very little or no antioxidant activity (Pokorny et al., 1965). The extracts of spent tea leaves, both green and black, have showed very weak antioxidant activity.

The extraction of tea to prepare antioxidants are taught in a number of prior art references. For example, British patent application No. 2,151,123, "Extraction of Green Tea Antioxidants and Their Antioxidant Activities in Various Edible Oils and Fats" (Lee and Sher, 1984), Department of Agricultural Chemistry, National Taiwan University, Taipei, Taiwan; "Safety Evaluation of Natural Antioxidants from Tea" (Lee et al., 1984), Department of Agricultural Chemistry, National Taiwan University, Taipei, Taiwan; "Natural Antioxidants I. Antioxidative Components of Tea Leaf" (Tanizawa et al., 1984), Chemical Pharmaceutical Bulletin, Volume 32 (5), pages 2011-14; "Food Antioxidants from Green Tea", Japanese Patent Publication No. 59,219,384; "Tea Extracts as Antioxidants", Japanese Patent Publication No. 59 45, 385, Mar. 14, 1984; "Antioxidative Activity of Tea Leaf Catechins" (Matsuzaki and Hara, 1985) Nippon Nogei Kagaku Kaishi, Volume 59 (2), pages 129-34 (Japan); and "Antioxidative Activity in Black Tea" (Mori and Mitani, 1978), Kaseigaku Zasshi, 1978, Volume 29 (3), pages 148-14 (Japan).

ADVANTAGES OF THE PRESENT INVENTION

The process of the present invention produces a highly effective antioxidant from spent green or black tea leaves which are a waste residue in the manufacture of instant tea. Furthermore the antioxidant produced by the method of the present invention is miscible with oil.

The present invention is unobvious because the extraction of spent green or black tea with different solvents does not yield an extract with effective antioxidant. Furthermore, the extract of such a process is insoluble in oil.

Unused, that is, fresh, black or green tea can also produce a highly effective antioxidant by the process of the present invention.

SUMMARY OF THE INVENTION

It has been discovered that the vacuum steam distillation of a suspension of tea leaves, spent tea leaves, or their extract in a high boiling liquid such as corn oil, produces a distillate composition having high antioxidant activity.

DESCRIPTION OF THE DRAWING

A more complete understanding of the invention will be shown by reference to the drawing in which.

DETAILS OF THE PRESENT INVENTION

The Raw Materials

Figure 1:
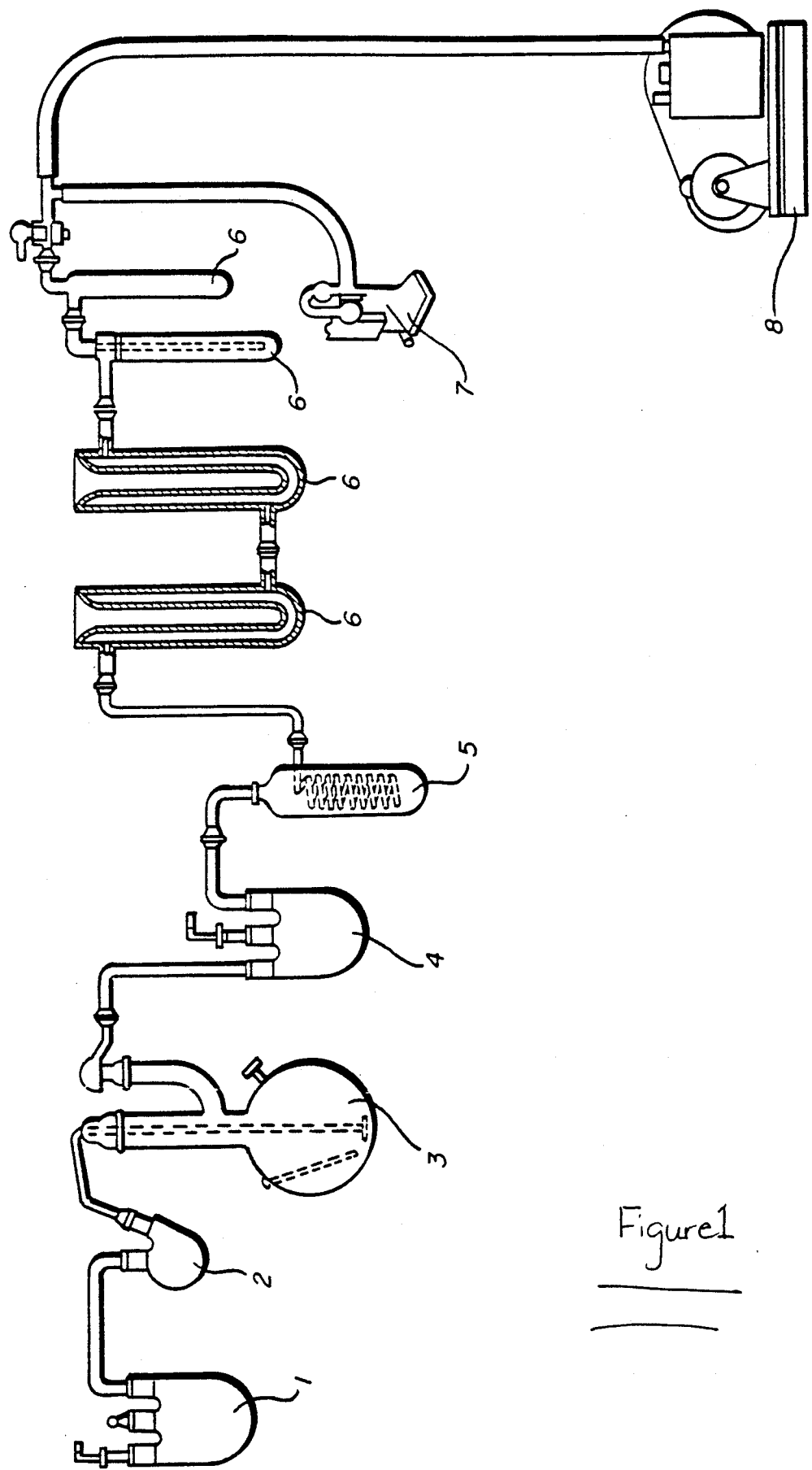
FIG. 1 is a schematic diagram of laboratory apparatus set up for vacuum steam distillation, which may be used to carry out the process of the present invention.

The raw materials for use in the present invention are spent tea leaves, which is the residual waste product remaining after extraction of the tea leaves to manufacture either instant green tea or instant black tea. The spent tea leaves may be either dry or wet. However, unused tea can also be used.

Tea is considered to be a desirable source of antioxidants for a number of reasons. There is an abundant supply of tea leaves all over the world and thus it is readily available. Tea has been widely used as a beverage for thousands of years and is generally considered safe. Spent tea leaves are a valueless waste in the manufacture of instant tea, and thus are economically available. Because tea is a beverage, an antioxidant derived from it would be ideal for use in other beverages, such as cold drinks, fruit drinks and the like.

Preparation of the Tea Leaves

The spent tea leaves can be used directly from the vat of the extraction for manufacturing instant tea while they are still wet by suspending them in the high boiling liquid used in the distillation and removing the moisture during the vacuum distillation process. Alternatively, the spent tea can be dried and then ground into fine powder and suspended in the high boiling liquid used in the vacuum distillation.

Alternatively, unused or fresh tea leaves can be used directly by grinding them into powder or they can be first extracted with a suitable solvent, such as methyl or ethyl alcohol, to obtain a tea leaf extract, which is then dried and ground into powder.

In yet another embodiment, spent tea leaves, after being dried and ground into fine powder, can also be extracted with a solvent, such as methyl or ethyl alcohol, to yield spent tea leaf extract, which then can be suspended in oil for the vacuum distillation.

PROCESS CONDITIONS

The Distillation Process

The distillation process used in the present invention is known to those skilled in the art see, for example, U.S. Pat. No. 3,950,266 to Chang et al. It is generally preferred that the distillation be carried out in the presence of a high boiling liquid, such as one of the triglyceride oils, such as corn oil, sunflower oil, cottonseed oil, or the like. The distillation process may be carried out at a wide variety of temperatures. It is preferred that the distillation be carried out at a temperature between 150° C. and 250° C., with the range of 185° C. and 215° C. being most preferred.

A suitable apparatus set-up is illustrated by FIG. 1. The vacuum steam distillation may be carried out using any inert gas in place of the steam. For example, carbon dioxide may be used in lieu of the steam.

The distillation may be carried out under a wide variety of conditions, but the preferred conditions for carrying out the distillation are as follows:

1. A tea to oil ratio of 100 grams of tea leaves to 1,000–1,100 ml of oil; or
60–80 grams of tea extract to 1,000–1,100 ml of oil.
2. Vacuum as high as possible, preferably at least 0.2 to 0.01 mm of mercury.
3. Time—The distillation should be continued until practically no more distillate is collected —usually within 5 hours.

Distillation Without a Current of Inert Gas

The invention is unexpected, because without steam the yield of the distillate is extremely low. When 52 g. of Tea Leaf Extract, suspended in 1,000 ml. of corn oil, was vacuum distilled with stirring at 200°±5° C., under 0.01 mm Hg. for 3 hours without steam, the yield of Distillate A was only 1.5 g., and Distillate 8 only 0.9 g., both of which are approximately one-fifth of those when steam is used. In addition, Distillate A, obtained without steam, yielded a purified product as low as only 0.4 g. after purification.

Molecular Distillation

The natural tea antioxidant can also be obtained as a distillate by molecular distillation, such as a typical falling film still, with or without using steam as a carrier. The tea leaves, spent tea leaves, or their extracts, can be ground to fine powder and then suspended in a triglyceride oil. The suspension is then homogenized with a Polytron homogenizer (T145/80). The homogenized mixture is then submitted to molecular distillation to collect the distillate as an antioxidant.

The following Examples will serve to illustrate the preparation of antioxidants from tea and several mechanisms for purifying such products, but it is understood that these Examples are set forth merely for illustration and many other variations on the processes may be used.

EXAMPLE 1

Distillation of Green Tea Leaves (GT)

1,000 ml. of refined, bleached and deodorized corn oil was vacuum steam distilled at 200° C., 0.01 mm. Hg. vacuum for four hours with 250 ml. of water to remove as much distillate as possible, such as free fatty acids, tocopherols and sterols. Approximately 1 g. of distillate was obtained and removed. This step of prevacuum steam distillation of commercial corn oil is optional.

80 g. of finely ground dry green tea leaves (passes 28 mesh), known commercially as "Dragon Well" tea, were mixed with the oil. The mixture was vacuum steam distilled at 195°–205° C. under 0.01 mm Hg. vacuum for 4–5 hours with approximately 250 ml. of water used to provide the steam. The product was identified as "GTD".

The oil suspension of the tea leaves was put into Flask 3, as shown in FIG. 1. Water in excess was put into Reservoir 1. Flask 2 was for safety purposes. The distillate collected on the surface at temperatures of 20° C. and above, such as those of the connecting tubes, and Flask 4 and Heat Exchanger 5, was coded "Fraction A" (GTD-A), which weighed 4.5 g., corresponding to 5.6% of the weight of tea leaves at the start. The more volatile distillate collected in Cold Traps 6 was separated from water condensed in these traps cooled with dry ice-acetone slurries. This distillate was coded "Fraction B" (GTD-B) which weighed 0.7 g., corresponding to 0.9% of the weight of the tea leaves.

EXAMPLE 2

Distillation of Green Tea Extract (GTE)

60 grams of dry ground green tea leaves with the trade name of "Dragon Well", which passes 28 mesh, were refluxed under stirring with 360 ml. of methanol for one and a half hours. The mixture was filtered with a Buchner funnel. The residue was extracted again with 240 ml. of methanol for one and a half hours under refluxing and stirring. The mixture was again filtered. The filtrates from the two extractions were combined and the solvent was removed under vacuum to yield 21.0 g. of tea extract, TE.

| Other Solvents Used | | |
|---|---|---|
| Ethanol | yield | 29.1% |
| Ethyl Ether | yield | 7.5% |
| Ethyl Acetate | yield | 11.2% |

50 g. of Green Tea Extract (GTE) in 1,100 ml. of corn oil, when vacuum steam distilled in the same manner as above, yielded 6.5 g. of GTED-A (10.8% by weight of GTE or 4.2% by weight of Green Tea Leaves) and 0.9 g. of GTED-B (1.8% by weight of GTE or 0.7% by weight of Green Tea Leaves).

EXAMPLE 3

Distillation of Spent Green Tea Leaves (SGT)

6.78 Kg. of Spent Green Tea Leaves (SGT) containing 70% moisture were freeze-dried under 5-30 mm Hg. at 40°-50° C. for 20-22 hours. The product was rolled and crushed to yield 2.1 Kg. of spent tea powder containing 2% moisture.

100 g. of the spent tea powder in 1,000 ml. of corn oil were vacuum steam distilled under the same conditions as Example 1 to yield 3.9 g. of Spent Tea Distillate A (SGTD-A) and 0.8 g. of Spent Green Tea Distillate B (SGTD-8).

EXAMPLE 4

The Distillation of Spent Green Tea Extract (SGTE)

60 g. of Spent Green Tea Extract (SGTE), suspended in 1,000 ml. of corn oil, were vacuum steam distilled at 195°-200° C. under 0.01 mm Hg. for 4-5 hours with 210 ml. of water. 5.5 g. of Spent Green Tea Extract Distillate A (SGTED-A) and 3.3 g. of Spent Green Tea Extract Distillate B (SGTED-B) were obtained.

EXAMPLE 5

Direct Distillation of Wet Spent Green Tea Leaves from The Manufacture of Instant Tea 335 g. of Wet Spent Green Tea, which contained approximately 70% of moisture, were suspended in 1,000 ml. of refined and deodorized corn oil. The mixture was homogenized with a Polytron homogenizer (T145/80) (Kinematica GmbH, Switzerland). The homogenized mixture was vacuum steam distilled under carefully controlled temperatures and pressures so that most moisture was removed without spattering of the oil. The temperature was then raised to 215°±2° C., while the vacuum was raised to 0.05 mm Hg. The distillation was continued as in Example 1. Distillate Fraction A (SWGTD-A) weighed 9.6 g., which yielded 2.7 g. of product (PSWGTD-A) after purification. Fraction B (SWGTD-B) weighed 22.7 g.

The experiment of Example 5 was repeated at about 185° C. and 200° C. The experiment at 185° C. yielded 0.60 grams of purified Fraction A, and 1.10 grams of Fraction B. The experiment run at 200° C. yielded 1.00 grams of purified Fraction A and 2.10 grams of Fraction B.

EXAMPLE 6

Direct Distillation of Wet Spent Black Tea Leaves From the Manufacture of Instant Tea 335 g. of Wet Spent Black Tea Leaves, which contained approximately 73.7 g. of dry materials, were mixed with 1,100 ml. of refined and deodorized corn oil and then homogenized. The temperature and pressure used for the vacuum distillation were as follows:

| Time (Hours) | Temperature (°C.) | Pressure (mm. Hg.) |
|---|---|---|
| 2.5 | 25-65 | 2-0.5 |
| 1.1 | 65-200 | 0.5-0.05 |
| 4.5 | 200 | 0.05 |

The steam consumed was 105 g. equivalent to 105 g. of water.

The yield of SWBTD-A was 5.8 g.; PSWBTD-A was 1.5 g. and SWBTD-B was 12.7g.

EXAMPLE 7

Distillation With Carbon Dioxide

The steam in the vacuum steam distillation described above can be replaced by a stream of carbon dioxide, provided liquid nitrogen is used in the cold traps to condense the gas.

60 g. of Green Tea Leaf Extract, suspended in 1,000 ml. of corn oil, was distilled at 200° C.±2° C. under 0.01 mm Hg. for four hours with 860 g. of solid carbon dioxide. The total distillate weighed 4.0 g. Its appearance and odor were similar to that of the distillate obtained by vacuum steam distillation.

EXAMPLE 8

Solvent Purification of Green Tea Distillate (GTD-A)

3.9 g. of Green Tea Distillate (GTD-A) from Example 1 were extracted three times at room temperature with 80 ml. of ethyl ether each time. The ethyl ether extract, after freed of solvent (2.7 g.), was mixed with 100 ml. of methanol, agitated well, then allowed to stand at −5° C. for 6 hours or longer. The precipitate was filtered out. The methanol solution was freed of solvent under vacuum to yield 2.0 g. of Solvent-Purified Tea Distillate (PGTD-A).

EXAMPLE 9

Solvent Purification of Green Tea Extract Distillate (GTED-A)

By the method described in Example 8, 9.5 g. of GTED-A from Example 2, from "Dragon Well" green tea leaves produced 4.80 g. of Solvent-Purified Green Tea Extract Distillate (PGTED-A), which corresponds to 50.5% yield from GTED and 2.7% yield from tea leaves.

EXAMPLE 10

Solvent Purification of Spent Green Tea Distillate (SGTD-A)

By the method described in Example 8, 3.9 g. of SGTD-A from Example 3 yielded 2.3 g. of Solvent Purified Spent Green Tea Distillate (PSGTD-A).

EXAMPLE 11

Solvent Purification of Spent Green Tea Extract Distillate (SGTED-A)

4.75 g. of Spent Green Tea Extract Distillate (SGTED-A) (Example 4) were extracted three times with 120 ml. of ethyl ether each time. The ethyl ether soluble material was mixed with 100 ml. of methanol, stirred thoroughly for 15 minutes and let stand at $-5°$ C. for 6 hours. The insoluble material and precipitates were removed by filtration. The methanol solution was freed of solvent under vacuum to yield 3.9 g. of Solvent-Purified Spent Green Tea Extract Distillate (PSGTED-A).

In order to demonstrate the antioxidant properties of the products of the various Examples, the following comparisons were made:

The antioxidant function of the various natural tea antioxidants, prepared according to the methodology described in the Examples, was measured by adding 0.02% of the preparation into fresh prime steam lard. The samples were aged at 60° C. for 1, 2, 3 and 4 weeks. The smaller increase in peroxide value indicates the slower rate of oxidation and, therefore, the higher effectiveness in antioxidant activity of the additive.

TABLE I

Comparison of Antioxidant Activity of Extract of Fresh Unused Green Tea and Spent Green Tea*

| Description | Peroxide Value (meq/kg) After Storage at 60° C. for Days | | | |
|---|---|---|---|---|
| | 7 | 14 | 21 | 28 |
| No Additive | 3.4 | 56.9 | 134 | 222 |
| BHA (0.02%) | 1.9 | 3.7 | 6.8 | 8.9 |
| Example 1 GT (0.02%) | 3.2 | 40.6 | 108 | 172 |
| Example 2 GTE (0.02%) | 2.7 | 3.9 | 5.5 | 9.1 |
| Example 4 SGTE (0.02%) | 3.9 | 5.8 | 11.0 | 67.7 |

*Extract of black tea has been reported in the literature as having very little antioxidant activity (Pokorny, 1965) and (Sher et al., 1983, Chung-Kuo Nung Yea Hua Hsueh Hui Chih).

TABLE II

Antioxidant Activity of Purified Tea Distillate A (Green and Black) Prepared at Different Distillation Temperatures

| Additive (All are 0.02% except those noted.) | Peroxide Value (meq/Kg) Days Stored at 60° C. | | | |
|---|---|---|---|---|
| | 7 | 14 | 21 | 28 |
| None | 4.8 | 33.9 | 107 | 176 |
| 0.025% BHA | 2.7 | 9.0 | 16.8 | 25.0 |
| 0.02% BHT | 0.9 | 1.5 | 2.4 | 3.20 |
| 0.025% dl-α-Tocopherol | 12.1 | 27.1 | 33.0 | 55.4 |
| 0.05% dl-α-Tocopherol | 14.5 | 46.4 | 74.2 | 133 |
| GTD-A Example 1 | 0.8 | 1.4 | 1.6 | 1.9 |
| PGTD-A Example 8 | 0.5 | 0.7 | 0.8 | 1.2 |
| GTED-A Example 2 | 0.4 | 1.0 | 1.2 | 1.6 |
| PGTED-A Example 9 | 0.5 | 0.7 | 0.8 | 1.2 |
| SGTD-A Example 3 | 0.5 | 0.6 | 0.9 | 1.1 |
| PSGTD-A Example 10 | 0.8 | 0.7 | 0.7 | 1.0 |
| SGTED-A Example 4 | 0.7 | 3.9 | 0.9 | 1.2 |
| PSGTED-A Example 11 | 0.6 | 0.6 | 0.7 | 1.0 |
| PSWGTD-A (185° C.) Example 5 | 0.8 | 1.4 | 1.8 | 2.4 |
| PSWGTD-A (200° C.) Example 5 | 0.8 | 1.2 | 2.2 | 3.0 |
| PSWGTD-A (215° C.) Example 5 | 0.6 | 1.2 | 1.6 | 2.3 |
| PSBTD-A (200° C.) | | | | |
| PSWBTD-A (200° C.) | 0.6 | 1.1 | 1.5 | 2.1 |
| Example 6 | | | | |

NOTE: The POV of the starting lard was 0.4 meq/Kg

TABLE III

Antioxidant Activity of Tea Distillate B (Green and Black) at Different Temperatures

| Additive (0.02%) | Peroxide Value (meq/Kg) Days Stored at 60° C. | | | |
|---|---|---|---|---|
| | 7 | 14 | 21 | 28 |
| None | 3.4 | 56.9 | 134 | 222 |
| BHA | 1.9 | 3.7 | 6.8 | 8.9 |
| GTD-B (Example 1) | 0.7 | 1.1 | 1.6 | 1.8 |
| GTED-B (Example 2) | 0.6 | 0.9 | 0.8 | 1.4 |
| SGTD-B (Example 3) | 3.5 | 8.0 | 33 | 104 |
| SGTED-B (Example 4) | 1.7 | 1.7 | 1.9 | 2.4 |
| SWGTD-B (185° C.) (Example 5) | 0.9 | 2.2 | 8.3 | 37.0 |
| SWGTD-B (200° C.) (Example 5) | 2.4 | 12.1 | 52.8 | 132 |
| SWGTD-B (215° C.) (Example 5) | 2.4 | 12.1 | 61.6 | 135 |
| SWBTD-B (200° C.) (Example 6) | 1.4 | 4.6 | 17.8 | 73.3 |

TABLE IV

Antioxidant Activity of Tea Extract Distillate at Different Concentrations

| Additive | Concentration (%) | Peroxide Value (meq/Kg) Days Stored at 60° C. | | | |
|---|---|---|---|---|---|
| | | 7 | 14 | 21 | 28 |
| Control, none | — | 3.40 | 46.7 | 134 | 222 |
| BHA | 0.02 | 1.94 | 3.74 | 6.08 | 8.92 |
| BHT | 0.02 | 1.06 | 1.38 | 1.76 | 2.50 |
| PGTED-A | 0.001 | 0.76 | 1.85 | 45.6 | 56.5 |
| (Example 9 | 0.005 | 0.60 | 0.68 | 0.72 | 0.80 |
| purified | 0.01 | 0.62 | 0.68 | 0.60 | 0.74 |
| material from Example 2) | 0.02 | 0.70 | 0.46 | 0.62 | 0.66 |

This table indicates that 0.005% of the purified distillate is as effective as 0.02% of BHT and more effective than 0.02% of BHA. Therefore, an antioxidant composition containing 25% of the purified distillate should be comparable or better than 100% BHA or BHT.

Table V sets forth data from Examples 5 and 6 in order to observe the effect of distillation temperature upon the yield of distillate.

TABLE V

Effect of Distillation Temperature Upon the Yield of Distillate

| Sample Distillate | Yield of Distillate at Temperature (°C.) | | |
|---|---|---|---|
| | 185 | 200 | 215 |
| PSWGTD-A (Example 5) | 0.60 | 1.00 | 2.70 |
| SWGTD-B (Example 5) | 1.10 | 2.10 | 22.70 |
| PSWBTD-A (Example 6) | — | 2.0 | — |
| SWBTD-B (Example 6) | — | 17.2 | — |

Analysis of the distilled antioxidants by high performance liquid chromatographic method suggests Pyrogallol may be a possible component of the distillate antioxidant.

The antioxidant material prepared by the method of the present invention may contain as much as 20% of Pyrogallol when unused tea (green and black) is used as the starting material. Since Pyrogallol is an undesirable component in food because of its toxic properties, it has been unexpectedly discovered that the Pyrogallol content of the antioxidant material is significantly lower, i.e., less than 10%, when spent tea is used as the starting material.

The Pyrogallol content of the antioxidant material can be further decreased to less than 0.4% if the spent tea (green and black) is extracted with solvents to remove the catechins. Example 12 illustrates a useful method for removing catechins from spent tea.

EXAMPLE 12

300 g. samples of ground tea, spent black tea and spent green tea, were extracted with 3 l. of hexane. The extract after removal of solvent was labeled A. The residue was mixed with 3 l. of distilled water and maintained at boiling with stirring for 30 minutes. The aqueous suspension was extracted with chloroform 3 times, each with 500 ml. The chloroform extract after removal of solvent was labeled B. The remaining aqueous phase was extracted 3 times with ethyl acetate, using 600 ml each time. The ethyl acetate extract, which was rich in catechins was discarded. The aqueous phase was then dried and labeled C. Fractions A, B, and C were combined and steam distilled in the same manner as described in Example 2 to yield the antioxidant material.

TABLE VI

Antioxidant Materials From Tea and Spent Tea

| Sample | Yield (%) | Antioxidant Property Peroxide Value with 0.02% of sample in lard, 4 weeks at 60° C. | Pyrogallol % |
| --- | --- | --- | --- |
| PGTED | 1.9 | 1.8 | 18.2 |
| PGTED (Example 12) | 0.9 | 1.8 | 1.1 |
| PSGTED | 1.0 | 1.7 | 6.2 |
| PSGTED (Example 12) | 0.4 | 2.8 | 0.4 |
| PSBTED | 0.5 | 1.6 | 10.6 |
| PSBTED (Example 12) | 0.4 | 9.3 | <0.4 |

The yield of the antioxidant distillates (as compared to the yield for extracts) is shown in Table VII below. The figures given are averages of several experiments with a variation of approximately 10%.

TABLE VII

| | Yield of Tea Antioxidants | | |
| --- | --- | --- | --- |
| Product | Yield (% of Dry Tea Leaves) | | |
| | | Total | |
| Extract | | | |
| GTLE | | 37.9 | |
| SGTLE | | 14.7 | |
| SBTLE | | 9.2 | |
| Distillate | A | PA* | B |
| GTD | 5.6 | 2.9 | 2.5 |
| GTED | 3.8 | 1.8 | 0.8 |
| SGTD | 3.9 | 1.0 | 0.8 |
| SGTED | 0.8 | 0.6 | 0.3 |
| SBTED | 1.0 | 0.5 | 0.1 |
| SWBTD | 5.8 | 2.1 | 0.6 |

*Purified Distillate A

The forms of invention herein shown and described are to be considered only as illustrative. It will be apparent to those skilled in the art that numerous modifications may be made therein without departure from the spirit of the invention or the scope of the appended claims.

We claim:

1. A method of producing a tea-based antioxidant composition from a tea material, said tea material being selected from the group consisting of green tea leaves, black tea leaves, spent extracted green tea leaves, and spent extracted black tea leaves, comprising:
   a) suspending said tea material in an oil having a high boiling point;
   b) subjecting the suspension of tea material and high boiling oil to steam distillation at reduced pressure and at a temperature which distills the antioxidant material as the distillate; and
   c) recovering the tea-based antioxidant material as the distillate.

2. The method of claim 1, wherein said tea-based antioxidant distillate is purified by extraction with ether.

3. The method of claim 2, which includes the step of extracting the tea-based antioxidant distillate with ethyl ether, dissolving the ether extract in methanol, chilling said methanol solution to form a precipitate, removing said precipitate and recovering purified tea-based antioxidant from said methanol solution.

4. The method of claim 1, wherein prior to distillation, catechins are removed from said tea material.

5. The method of claims 1, 2, 3 or 4, wherein said tea material is spent green tea leaves.

6. The method of claims 1, 2, 3 or 4, wherein said tea material is spent black tea leaves.

7. The method of claims 1, 2, 3 or 4, wherein said tea material is wet spent green tea leaves.

8. The method of claims 1, 2, 3 or 4, wherein said tea material is wet spent black tea leaves.

9. The method of claim 1, wherein said oil is corn oil.

10. The method of claim 1, wherein said oil is selected from the group consisting of corn oil, sunflower oil and cottonseed oil.

11. The method of claim 1, wherein the steam distillation is carried out in a temperature range of from 175°–225° C.

12. An antioxidant prepared by the method of claims 1, 2, 3, or 4.

13. An antioxidant prepared by the method of claim 5.

14. An antioxidant prepared by the method of claim 6.

15. An antioxidant prepared by the method of claim 7.

16. An antioxidant prepared by the method of claim 8.

17. A product of the method of claim 1, wherein the antioxidant is oil soluble.

18. The method of claim 1, wherein the steam of step C is at least partially replaced with a condensible inert gas.

* * * * *